United States Patent [19]
Connor et al.

[11] Patent Number: 4,960,531
[45] Date of Patent: Oct. 2, 1990

[54] ICE MELTER COMPRISING AN ALPHA-METHYL GLUCOSIDE AND METHOD OF MAKING SAME

[75] Inventors: Margaret B. Connor, Watertown; Joseph P. Tratnyek, Sudbury, both of Mass.

[73] Assignee: Koos, Inc., Kenosha, Wis.

[21] Appl. No.: 347,561

[22] Filed: May 5, 1989

[51] Int. Cl.$^5$ ............................ C09K 3/18; C09K 5/00
[52] U.S. Cl. ........................................ 252/70; 252/76; 106/13
[58] Field of Search ....................... 252/70, 76; 106/13

[56] References Cited

U.S. PATENT DOCUMENTS

| Re. 32,477 | 8/1987 | McConnell | 252/70 |
| 4,439,337 | 3/1984 | Nimerick et al. | 252/70 |
| 4,501,775 | 2/1985 | Parks et al. | 427/220 |
| 4,668,416 | 5/1987 | Neal | 252/70 |
| 4,698,173 | 10/1987 | Hansen | 252/70 |

*Primary Examiner*—Paul Lieberman
*Assistant Examiner*—James M. Silbermann
*Attorney, Agent, or Firm*—Lee, Mann, Smith, McWilliams & Sweeney

[57] ABSTRACT

This invention relates to a composition for melting ice at low temperatures, particularly for use in melting ice from driveways, sidewalks and the like. The composition includes mixtures of the salts, sodium and potassium chloride, urea, and a chemical enhancer (synergist) or trigger. The enhancer which quickens melt rate and effects lower ice-melting temperatures may be an additional inorganic salt, such as a carbonate or another chloride, or an organic compound with ether or hydroxyl groupings such as saccharides, alcohols, glycols, and glucosides.

The invention also includes the method of making the composition which includes the steps for example, of
(1) preparing a warm solution of urea
(2) spraying the potassium chloride portion of the salt combination with the urea solution,
(3) drying the potassium chloride urea composition;
(4) mixing said dried composition with the sodium chloride, and
(5) adding the trigger.

12 Claims, No Drawings

ICE MELTER COMPRISING AN ALPHA-METHYL GLUCOSIDE AND METHOD OF MAKING SAME

BACKGROUND OF THE INVENTION

1. Field of Invention

This invention relates to compositions for melting ice and snow at low temperatures and more particularly, for melting ice on driveways, sidewalks and the like. The invention also contemplates the method for making the composition.

2. Description of the Prior Art

De-icing compositions have long been known and have been used to melt ice on driveways, sidewalks and the like. Such compositions have included unrefined rock salt, which is impure sodium chloride, calcium chloride, aluminum chloride, magnesium chloride and other salt materials. There have been disadvantages with these materials. For example, the impurities in the rock salt leave an unsightly coating on a melted surface which when tracked indoors damages floors and carpeting. Both rock salt and calcium chloride can cause damage to vegetation, and calcium chloride is difficult to handle, being extremely hygroscopic.

U.S. Pat. No. RE. 32,477, which is assigned to a common assignee, discloses a composition for melting ice from driveways, sidewalks and the like which includes sodium and potassium chloride and urea. This composition is not as damaging as other de-icer materials in that it does not have as adverse an effect on vegetation and does not leave unsightly coatings due to the fact that less sodium containing material is used to obtain the desired result. However, this composition does not melt ice at as low a temperature as may be desired. Lower temperature melting can be achieved using calcium chloride. However, calcium chloride is extremely difficult to handle due to its water absorption qualities. Anhydrous calcium chloride can chemically burn skin.

OBJECTS OF INVENTION

A principal object of the present invention is to provide de-icing compositions, which include a chemical enhancer or trigger that in combination with the main salts have an improved melting capability while being free of the adverse side effects mentioned hereinbefore.

Another principal object of the invention is to provide a method of making such de-icing compositions.

SUMMARY OF THE INVENTION

The composition of this invention which includes sodium and/or potassium chloride and a melting point lowering chemical enhancing agent such as an inorganic salt, for example, a carbonate, or an additional chloride, or an organic compound containing an ether group or a hydroxyl group or groups such as saccarides, alcohols, glycols or glucosides, and more particularly methyl glucoside, is useful in ice removal while at the same time eliminating for the most part, damage to vegetation and household furnishings in that it does not leave unsightly traces and coatings which can damage carpeting and the like. Moreover, this composition is not hygroscopic thus eliminating problems with storage and use.

DESCRIPTION OF THE PREFERRED EMBODIMENT

The present invention, which is in an improvement on the invention disclosed and claimed in U.S. Pat. No. RE. 32,477, provides an ice melting composition designed to be operable at low temperatures primarily for use on driveways and sidewalks and the like which in commercial form is a dry stable material that lends itself readily to manual or machine application. The invention relates to a commercial composition including a salt, such as sodium chloride and/or potassium chloride and a melt-lowering enhancer or trigger such as an inorganic salt, for example a carbonate or an additional chloride, an organic compound containing an ether group or a hydroxyl group or groups such as saccharides, alcohols, glycols and glucosides and more particularly methyl glucoside which is characterized by an enhanced melting capability. From the foregoing, it can be seen that an ice melting composition has been provided which is simple to use and basically harmless to the user and to most of the environment in which it is used and particularly household furnishings and carpeting and wherein the composition includes a salt, preferably a mixture of sodium and/or potassium chloride together with a trigger which is preferably a glucoside and more preferably a methyl glucoside. The composition may also include urea which additionally enhances its melting capabilities.

The preferred chemical enhancing agent is a glucoside, more preferably methyl glucoside which is chemically referred to as an alpha methyl glucoside, a non reducing derivative of glucose, and a unique cyclic polyhydric alcohol. It has the following chemical formula,

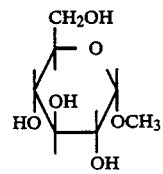

Other chemical compositions may also act as enhancers. For example, inorganic salts such as potassium carbonate, lithium chloride, magnesium chloride hexahydrate, and organic compounds such as an alkoxylated glucose derivative such as methyl glucose ether or containing a hydroxyl group or groups such as saccharides, alcohols and glycols, for example ethylene glycol, polyethylene glycol and other higher molecular weight glycols.

The alkoxylated glucose derivatives made by Amerchol Corporation and sold under the Trademark GLUCAM are 100% active, water soluble liquid emollients, humectants and moisturizers and may either have ethoxylates or propoxylates which have the following structural formulae:

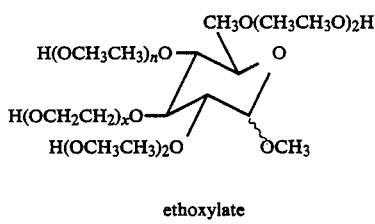

ethoxylate

-continued

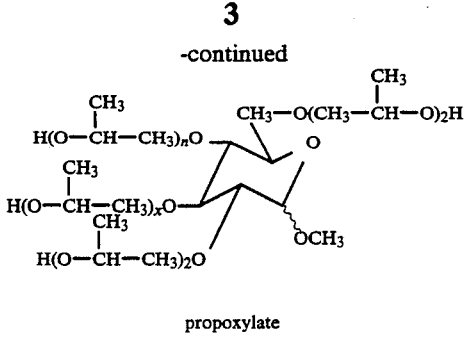

propoxylate

It is believed that the chemical enhancer performs in a synergistic manner so that the ice melting composition performs at lower temperatures than would be expected and ice-melting is accelerated.

When the trigger is present in the composition it is preferably there in amount of from about 1–10% by weight of the composition, more preferably from about 1–7% of the composition.

The urea component of the composition as disclosed in U.S. Pat. No. RE. 32,477, is coated in a warm solution on the potassium chloride salt of the composition with the urea being present in the total salt component from about 1% to 4% by weight of the salt. The sodium-potassium chloride combination can be varied rather widely from about a 3 to 1 ratio of sodium chloride to potassium chloride to a 1 to 1 ratio.

Testing of the de-icer compositions of this invention shows that they function at temperatures near to or below 0° F. so that the compositions of this invention are operable well below the freezing point of the ice and snow which will be found on driveways, sidewalks and the like in most areas.

The following table lists different formulations and de-icing performance,

| FORMULATIONS BY WEIGHT | LOWEST OPERABLE TEMPERATURE |
|---|---|
| 90:10 Base*: magnesium chloride hexahydrate | ** < −2° f. |
| 95:5 Base: lithium chloride | < −2° F. |
| 93:7 Base: alpha-methyl glucoside | < −2° F. |
| 95:5 Base: alpha-methyl glucoside | < −2° F. |
| 99:1 Base: alpha-methyl glucoside | < −2° F. |
| 95.5 Base: polyglycol E1000*** | < −2° F. |
| 97.5: 2.5 Base: potassium carbonate | < −2° F. |
| 95:5 Base: propoxylated (20 moles) methyl glucoside (Glucam P-20) | −3° to 0.5° F. |
| 95:5 Base: ethoxylated (20 moles) methyl glucoside (Glucam E-20) | −3° to 0.5° F. |
| 71:24:5 NaCl:KCl: alpha-methyl glucoside | < −2F |

*49.5% NaCl 49.5% KCl 1% Urea
**at least as low as
***molecular weight of about 1000

In making the compositions of this invention as previously mentioned, the potassium chloride is sprayed, for example, with urea and is then combined with the sodium chloride and the enhancer or trigger. Addition of the trigger resulted in a granular product containing for example, white opaque pellets. The shapes ranged from rectangular to nearly oval and the size ranged from one or two to many millimeters across. The general appearance of the ice melters of this invention is similar to the composition disclosed in U.S. Pat. No. RE. 32,477, but the coated pellets are much whiter and larger than their counterparts coated only with urea. When methyl glucoside is used as the trigger the ice melter is very white in appearance.

The compositions of this invention are very stable and have long shelf life. A sample of the ice melter of this invention, including a mixture of about 1 to 1 by weight sodium-potassium chloride with about 7% by weight of methyl glucoside added was left uncovered in a beaker for some time. During this time the sample was exposed to very humid and hot (nearly 100° F.) conditions. With only moderate shaking or tapping on a table top, the sample returned to its free flowing state. Such a condition could never be obtained with calcium chloride which would absorb water from the atmosphere and become completely unusable.

The methyl glucoside used in this invention is non-hazardous and biodegradeable. No toxic effects are known in connection with the methyl glucoside. The ice melters made in accordance with the teachings of this invention are not damaging to most vegetation when properly used and do not result in any unsightly coating on melted surfaces including indoor surfaces.

The methods used in combining the base salt chemical enhancing agent compositions of this invention including urea include spraying a warm solution of urea on the potassium chloride, drying, mixture with the sodium chloride then adding and mixing in the chemical enhancer. This method worked well for both solid and liquid chemical enhancers, whether added as a solid or made into aqueous solutions and sprayed on to the salt combination.

The following description gives a procedure for preparing a sample of the ice melter of this invention.

As granular white potassium chloride is discharged from a centrifugal bucket elevator onto a troughed conveyor belt it is sprayed with sufficient volume of 50% aqueous urea solution to result in a 2% urea concentration on the solid KCl. The moisture from the hot urea solution (150°–170° F.) dries in the storage pile, leaving crystalline urea adsorbed on the potassium chloride. The combination of potassium chlorideurea is weighed to give 50.5% of the final weight of the ice melter product. This results in approximately 1% urea concentration in the final product. Sodium chloride comprised 48.5% of the final product. The remaining 1% is a-methyl glucoside added during final weighing of materials as a solid. The weighed materials are conveyed to a mixer and thoroughly mixed.

The material is now ready for use.

The following formulations by weight showed the best de-icer capabilities of the ice melter of this invention.

48.5% NaCl
49.5% KCl
1% Urea
1% Alpha Methyl Glucoside
70% NaCl
23% KCl
7% Alpha Methyl Glucoside
46% NaCl
46% KCl
2% Urea
7% Alpha Methyl Glucoside
46% NaCl
47% KCl
7% Alpha Methyl Glucoside Additional compositions also showed good ice-melter properties when used at or above about 0° F. (see table on page 6). These were prepared by adding other chemical enhancing agents to the basic ice-melter composition of U.S. Pat. No. RE. 32,477 which contained by weight 49.5% NaCl, 49.5% KCl and 1% Urea. The compositions were then compounded as follows in percent by weight:

| | | |
|---|---|---|
| 97.5 :2.5 | Base: | Potassium Carbonate |
| 95 :5 | Base: | Lithium Chloride |
| 90 :10 | Base: | Magnesium Chloride hexahydrate |
| 95 :5 | Base: | Polyglycol E1000 (polyglycol having a molecular weight of 1000) |

What is claimed is:

1. An ice melter composition for use on driveways, sidewalks and the like comprising:
   a salt combination and a trigger enhancing agent;
   said trigger comprising alpha-methyl glucoside of the formulation

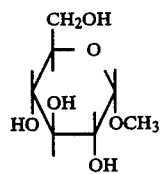

2. The ice melter of claim 1 wherein said trigger is present in amount of from about 1% to about 10% weight of the composition.
3. The ice melter composition of claim 2 wherein said salt combination comprises a mixture of sodium and potassium chloride.
4. The ice melter composition of claim 3 wherein said salt combination comprises a mixture of sodium and potassium chloride.
5. The ice melter composition of claim 4 wherein said salt combination includes urea.
6. The ice melter composition of claim 4 wherein said salt combination comprises from about 3 parts by weight of sodium chloride to about 1 part by weight of potassium chloride, to about one part by weight of sodium chloride to about 1 part by weight of potassium chloride.
7. The ice melter composition of claim 5 wherein said urea is present in from 1% to about 4% by weight of the salt combination.
8. An ice melter composition for use on driveways, side-walks and the like comprising:
   a salt combination comprising an approximately 50—50 mixture by weight of sodium-potassium chloride, approximately 1% to 4% by weight of the salt combination of urea, and a trigger,
   said trigger comprising alpha-methyl glucoside of the formulation

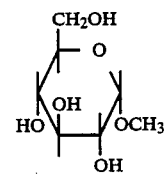

and being present in an amount of from about 1% to about 10% by weight of the composition.

9. The method of making an ice melter composition including a salt combination of potassium chloride, sodium, chloride and urea and a trigger comprising the steps of:
   (1) preparing a warm solution of urea
   (2) spraying the potassium chloride portion of the salt combination with the urea solution,
   (3) drying the potassium chloride urea composition;
   (4) mixing said dried composition with the sodium chloride, and
   (5) adding as a trigger alpha-methyl glucoside of the formulation

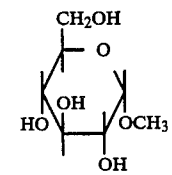

10. The method of claim 9 wherein said trigger is present in an amount of from about 1% to about 10% by weight of the composition.
11. The method of claim 10 wherein said urea is present in about 1% to about 4% by weight of the salt combination.
12. The method of claim 10 wherein said salt combination comprises approximately 50—50 mixture by weight of sodium and potassium chloride.

* * * * *